US007033273B2

(12) United States Patent
Olson

(10) Patent No.: US 7,033,273 B2
(45) **Date of Patent: *Apr. 25, 2006**

(54) LOTTO GAMING APPARATUS AND METHOD

(76) Inventor: Carl M. Olson, 2616 Sonoma St., Torrance, CA (US) 90503

( * ) Notice: Subject to any disclaimer, the term of this patent is extended or adjusted under 35 U.S.C. 154(b) by 198 days.

This patent is subject to a terminal disclaimer.

(21) Appl. No.: 10/406,731

(22) Filed: Apr. 3, 2003

(65) Prior Publication Data

US 2003/0190959 A1 Oct. 9, 2003

Related U.S. Application Data

(60) Division of application No. 09/680,200, filed on Oct. 4, 2000, now Pat. No. 6,554,710, which is a continuation-in-part of application No. 09/418,733, filed on Oct. 15, 1999, now abandoned, which is a continuation of application No. 08/673,817, filed on Jun. 27, 1996, now Pat. No. 6,080,062.

(51) Int. Cl.
*A63F 9/24* (2006.01)

(52) U.S. Cl. ............................ 463/26; 463/42; 463/17; 705/14; 273/269

(58) Field of Classification Search .................... 463/1, 463/9, 12–13, 16–19, 25–27, 30, 36, 40–42; 273/138.1, 138.2, 139, 269, 236–237, 292–293, 273/459–461; 379/90.01, 93.13; 705/1, 705/14, 16–17, 39; 700/91–93; 725/1, 23, 725/32, 74, 105, 109, 135, 141, 143, 153
See application file for complete search history.

(56) References Cited

U.S. PATENT DOCUMENTS 4,312,511 A 1/1982 Jullien
4,378,940 A 4/1983 Gluz et al.
4,455,025 A 6/1984 Itkis
4,624,462 A 11/1986 Itkis
4,704,696 A 11/1987 Reimer et al.
4,747,600 A 5/1988 Richardson
4,842,278 A 6/1989 Markowicz
4,856,787 A 8/1989 Itkis
4,875,686 A 10/1989 Timms
4,996,705 A * 2/1991 Entenmann et al. .......... 463/17
5,007,649 A 4/1991 Richardson
5,042,818 A 8/1991 Weingardt
5,178,395 A 1/1993 Lovell (Continued)

FOREIGN PATENT DOCUMENTS

EP 0310368 A2 4/1989

(Continued)

OTHER PUBLICATIONS

International Search Report Re PCGT/US97/08457.

(Continued)

*Primary Examiner*—Mark Sager
(74) *Attorney, Agent, or Firm*—Fulwider Patton LLP

(57) ABSTRACT

An individual electronic game for playing lotto wherein acknowledgment as to the player's win or loss status is rapidly displayed. The player plays his/her selected numbers against the electronic lotto gaming apparatus randomly generated win numbers. In addition, the lotto gaming apparatus can transfer and receive lotto game information to a central processing system which is capable of handling multiple players from multiple lotto gaming apparatus either within a certain gaming facility or on a more universal, state wide, nationally or internationally. An additional embodiment of the invention allows individual players of the lotto games, with rapid determination of win status, via an electronic telecommunications network.

34 Claims, 7 Drawing Sheets

U.S. PATENT DOCUMENTS

| | | | | |
|---|---|---|---|---|
| 5,232,221 | A | 8/1993 | Sludikoff | |
| 5,280,909 | A | 1/1994 | Tracy | |
| 5,282,633 | A | 2/1994 | Boylan et al. | |
| 5,297,802 | A * | 3/1994 | Pocock et al. | 463/19 |
| 5,326,104 | A | 7/1994 | Pease et al. | |
| 5,329,589 | A * | 7/1994 | Fraser et al. | 379/91.02 |
| 5,332,219 | A | 7/1994 | Marnell, II et al. | |
| 5,351,970 | A * | 10/1994 | Fioretti | 463/19 |
| 5,354,069 | A * | 10/1994 | Guttman et al. | 463/25 |
| 5,365,575 | A | 11/1994 | Katz | |
| 5,373,440 | A * | 12/1994 | Cohen et al. | 705/14 |
| 5,380,007 | A | 1/1995 | Travis et al. | |
| 5,393,057 | A | 2/1995 | Marnell, II | |
| 5,401,024 | A | 3/1995 | Simunek | |
| 5,403,999 | A | 4/1995 | Entenmann et al. | |
| 5,417,424 | A | 5/1995 | Snowden et al. | |
| 5,651,735 | A | 7/1997 | Baba | |
| 5,816,918 | A * | 10/1998 | Kelly et al. | 463/16 |
| 6,024,640 | A | 2/2000 | Walker et al. | |
| 6,080,062 | A | 6/2000 | Olson | |
| 6,554,710 | B1 * | 4/2003 | Olson | 463/42 |

FOREIGN PATENT DOCUMENTS

| | | | |
|---|---|---|---|
| EP | 0450520 | A2 | 10/1991 |
| GB | 2231809 | A | 11/1990 |
| GB | 2256594 | A | 12/1992 |

OTHER PUBLICATIONS

IGWB—"Gaming's Ball and Chain" Vo. 17, No. 10-Oct. 1996.

IGWB—Europe "Room for New Ideas" Taxining the Capitalists-May 1996.

Free Enterprise Spirit-Sep. 1996.

Video Lotto "There's A New Game In Town", Creative Gaming Concepts, St. Petersburg, Florida.

Oasis Electronic ITVM "The Future of the Scratch Ticket is Here".

U.S. Games, Inc. Pot-O-Gold Instant Electronic Lottery—Technical Description.

* cited by examiner

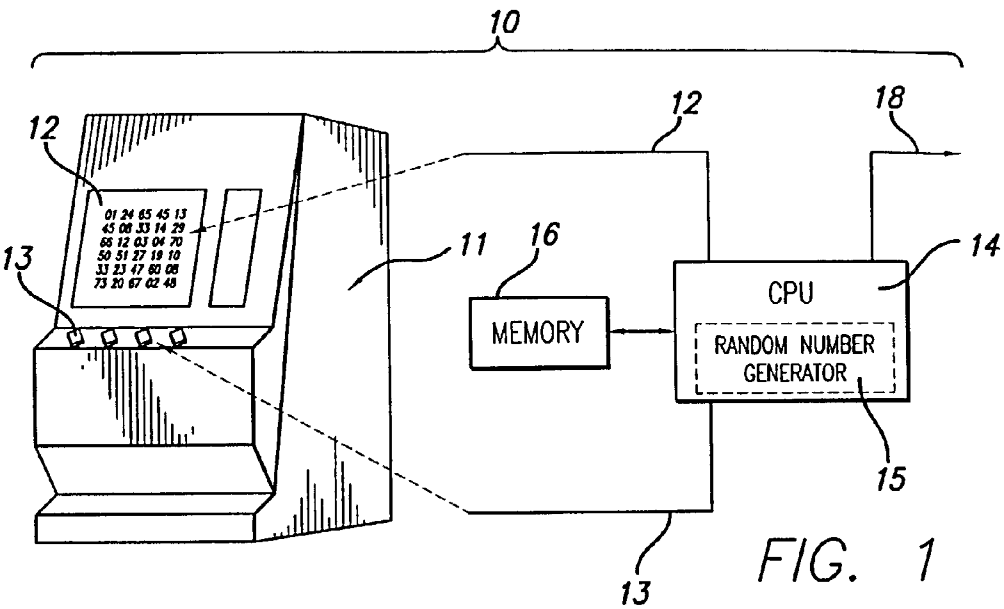
FIG. 1
FIG. 3
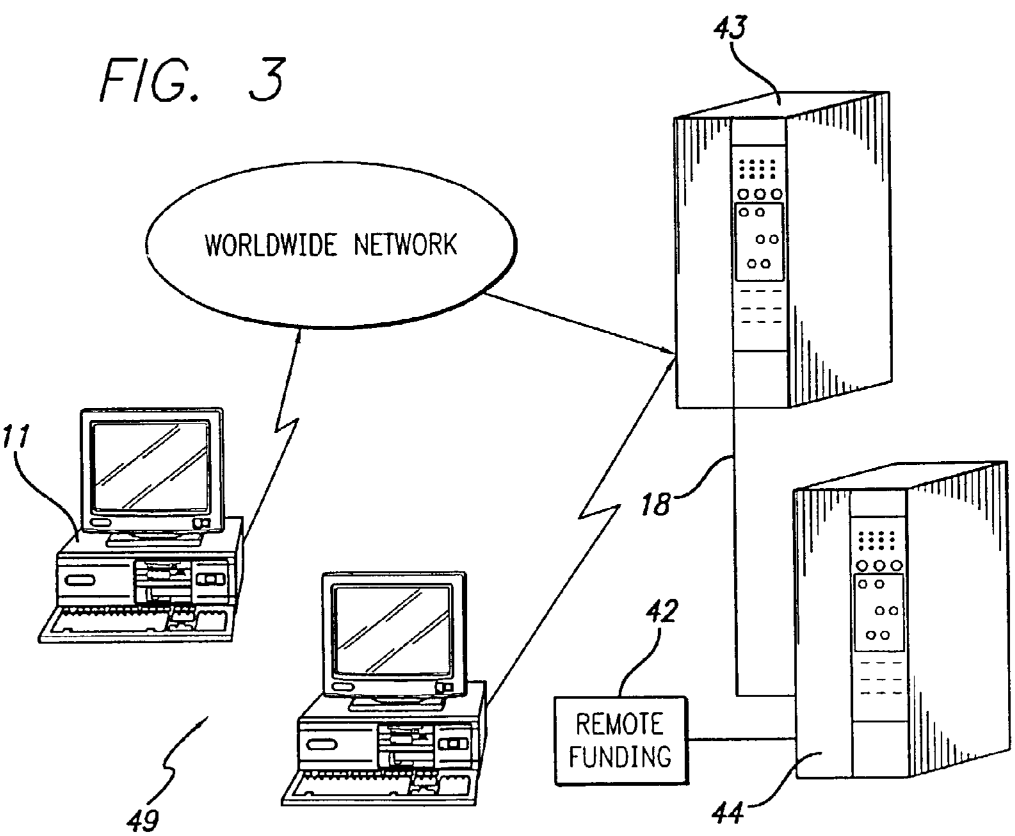

LOTTO GAMING APPARATUS AND METHOD

RELATED APPLICATIONS

This is a divisional of Ser. No. 09/680,200, filed Oct. 4, 2000, now U.S. Pat. No. 6,554,710 which is a continuation in part of Ser. No. 09/418,733, filed Oct. 15, 1999, abandoned, which is a continuation of Ser. No. 08/673,817, filed Jun. 27, 1996, now U.S. Pat. No. 6,080,062.

BACKGROUND OF THE INVENTION

1. Field of the Invention

This invention relates to electronic lottery type games, and more particularly to a lotto game which provides the player with rapid acknowledgment of the win or loss status of the numbers played.

2. Description of Related Art

Generally, lotto is played as a state-wide governmental system where the player chooses to play the game by wagering money, usually in one dollar ($1.00) increments, and obtaining some form of lotto ticket with the player's lotto numbers selection printed thereon. During predetermined intervals, the game is open to any new players and is then closed, at a regularly scheduled selected period. At the time of the closing of the lotto game, a series of random numbers are selected by the agency running the lotto game and winners are determined by the players matching their selected numbers with those randomly selected by the lotto agency. Winners are notified only if they observe the announcements of the winning numbers through the mass media, or if they check the winning numbers posted at a lotto ticket dispensing facility.

Attempts have been made to automate lotto games, but in every case the automation has generally been limited to the mechanics of selection of numbers and issuance of tickets to players of the lotto game, or the computer visualization of the traditional lotto mechanical number selection apparatus. What is needed is a system for a lotto game that allows the player to initiate play of the lotto game with numbers selected by the player, and that provides the player with instant acknowledgment of the win or loss status of the numbers selected by the player against those randomly selected by the machine on which the game is being played, or by the agency administering the lotto game. This invention provides such a system for playing a lotto game.

SUMMARY OF THE INVENTION

This invention is directed to a lottery type gaming apparatus and method wherein the player can initiate play of the lottery type game with numbers selected by the player, and the player is provided with a rapid acknowledgment of the winning or losing status of the numbers selected by the player. The player can initiate play through an interface unit which can take the form of a gaming console of the type found in gaming parlors and the like, but the term can also apply to any of a variety of computer terminals such as personal computers and computer gaming terminals or the like. The console can contain the software and hardware components of the win/loss gaming apparatus or it can be located elsewhere in the system. Once a player selects a series of numbers and initiates play of the game, the gaming apparatus of the invention nearly instantly determines whether any, or all, of those numbers match the set of numbers randomly selected by the apparatus as the winning numbers. If the player is a winner, the gaming apparatus pays or credits the winner without delay. In one presently preferred embodiment of the invention, the gaming apparatus can be played independent of a master controller, master number selection system, or any delays waiting for future winning number selection drawings.

In another presently preferred embodiment of the invention, each gaming apparatus is connected with an appropriate master controller, and may thereby be connected with other gaming apparatus, so that each player simultaneously plays the lottery type game against the gaming apparatus on which the game is being played and against the master controller. In this embodiment, the player selects a series of numbers on the gaming apparatus. The local gaming apparatus generates a randomly selected series of numbers which represent the winning set of numbers and instantly identifies which of the players numbers are a match. The player is thereafter notified of the winning, or losing, status of his/her selected numbers. The local gaming apparatus also sends the player's selected numbers to a master controller which has generated another randomly selected series of numbers. The player's selected numbers are compared with the master controller randomly selected numbers to determine the win, or lose, status of the player's selection of numbers. At the same time that the master controller is determining the status of player #1's selections, players #2 through #n are also being reviewed by the master controller for a win or loss status. This embodiment of the invention, by combining the selections and payoffs of more than one device, can provide larger payouts to the individual players. This embodiment of the invention further provides instant status of increasing, (progressive), payouts at the master controller concerning payouts to, and inputs from, the connected gaming apparatuses. This embodiment of the invention need not be limited to a selection of gaming apparatuses within a single casino, bar, store, or other gaming facility. It can be collective games played over a group of gaming facilities, over a state, national or international network.

Another embodiment of the invention provides a means for playing a lottery type game through a personal computer, or home video game terminal via an electronic communications network. In such an embodiment, the personal computer or game terminal can act as a gaming console analogous to a dedicated gaming apparatus through the use of appropriate software and interact, if necessary, with a master controller over the internet or other network connection.

In any of the embodiments in which multiple gaming apparatuses are connected to a master controller, one objective in the invention can be to provide a variable win/loss capability, such that the actual and relative amounts of wins versus losses can be adjusted. This adjustment can be accomplished, as an example, by changing the jackpot seed amount, (the minimum level of the progressive jackpot after payout of a win), or by adjusting the number of numbers from which the player will select, (e.g.: 51, 60, 70, etc.). While a game involving a choice of six numbers is used for the purpose of illustration, it will be understood that the choice of number of picks from a given number of possibility (e.g. 6 from 49, etc.) may be used to provide appropriate odds for winning.

A typical game would find the player inserting the appropriate wager, (e.g.: $1.00) into the gaming apparatus and selecting up to six numbers, (or alternatively, a selection of a "quick-pick" which commands the device to randomly select six numbers for the player). When satisfied with the numbers set selected, the player then would push the PLAY button on the gaming apparatus and the game is automatically played, comprising the following steps:

1. The gaming apparatus initiates an internal random number generator which selects the six winning numbers for that one play,
2. The six winning numbers are displayed on the screen on the face of the gaming apparatus,
3. The player is instantly notified, on the screen of the gaming apparatus, if any of the player selected numbers match the gaming apparatus selected winning numbers,
4. The player is paid any winnings according to a published schedule either displayed on the screen or attached to the gaming apparatus, (for example: two of six numbers may pay $5.00, three of six numbers $50.00, and six of six numbers $500.00) and,
5. The player is asked if another game is to be played, and if so to insert another wager, thus repeating the PLAY cycle.

In those embodiments of this invention where multiple gaming apparatus are interconnected through a master controller, with each PLAY, the player could have an opportunity to win at three independent levels with three distinct randomly selected winning number combinations played against a single six number combination selected by the player at the gaming apparatus he is currently playing. At the gaming apparatus where the player has selected six numbers, a random number generator has selected a six number winning lotto pick which is applicable only for that gaming apparatus. At the same time of that PLAY, the player's selected numbers are forwarded, via a secure electronics network to a master controller at a casino or other gambling facility level where a separate random number generator has already selected a six number winning combination for that PLAY. Simultaneously to these two PLAY events, the player's selected numbers may also be sent, via a secured electronics network, to a state or national level master controller where a distinct third set of six randomly generated winning numbers have been selected for that PLAY. The player therefore could be a winner at any one of the three levels, or any combination of the three; as an example: two out of six matching numbers at the national level, three out of six at the state level, with no matching numbers at the gaming apparatus. The screen on the gaming apparatus where the PLAY originated will display the results of all three "games" simultaneously. Since the probability of success of a six out of six pick typically reaches lottery proportions, the dollar amount for a "pick-six" can rapidly reach multi-millions in a relatively short period of time.

An important improvement of this gaming apparatus over prior art lottery type games is the rapid acknowledgment of the win or loss status of the player's selected numbers and the ability of the player to then immediately play another game without delays of hours or days before another game will close and the winning numbers are selected.

Other features and advantages of the present invention will become more apparent from the following detailed description of the invention, which, when taken in conjunction with the accompanying drawings illustrate by way of example the benefits of the invention.

BRIEF DESCRIPTION OF THE DRAWINGS

FIG. 1 is a functional diagram of the lotto gaming apparatus of the invention which depicts interaction of the CPU with integral random number generator, keyboard, video display, and local area network.

FIG. 3 is a functional diagram of the invention depicting a worldwide lotto game network where home computers interface, via direct dial-up or through an electronic communications system, with a worldwide lotto system and lotto accounting system.

DETAILED DESCRIPTION OF THE PREFERRED EMBODIMENTS

Figure 2:
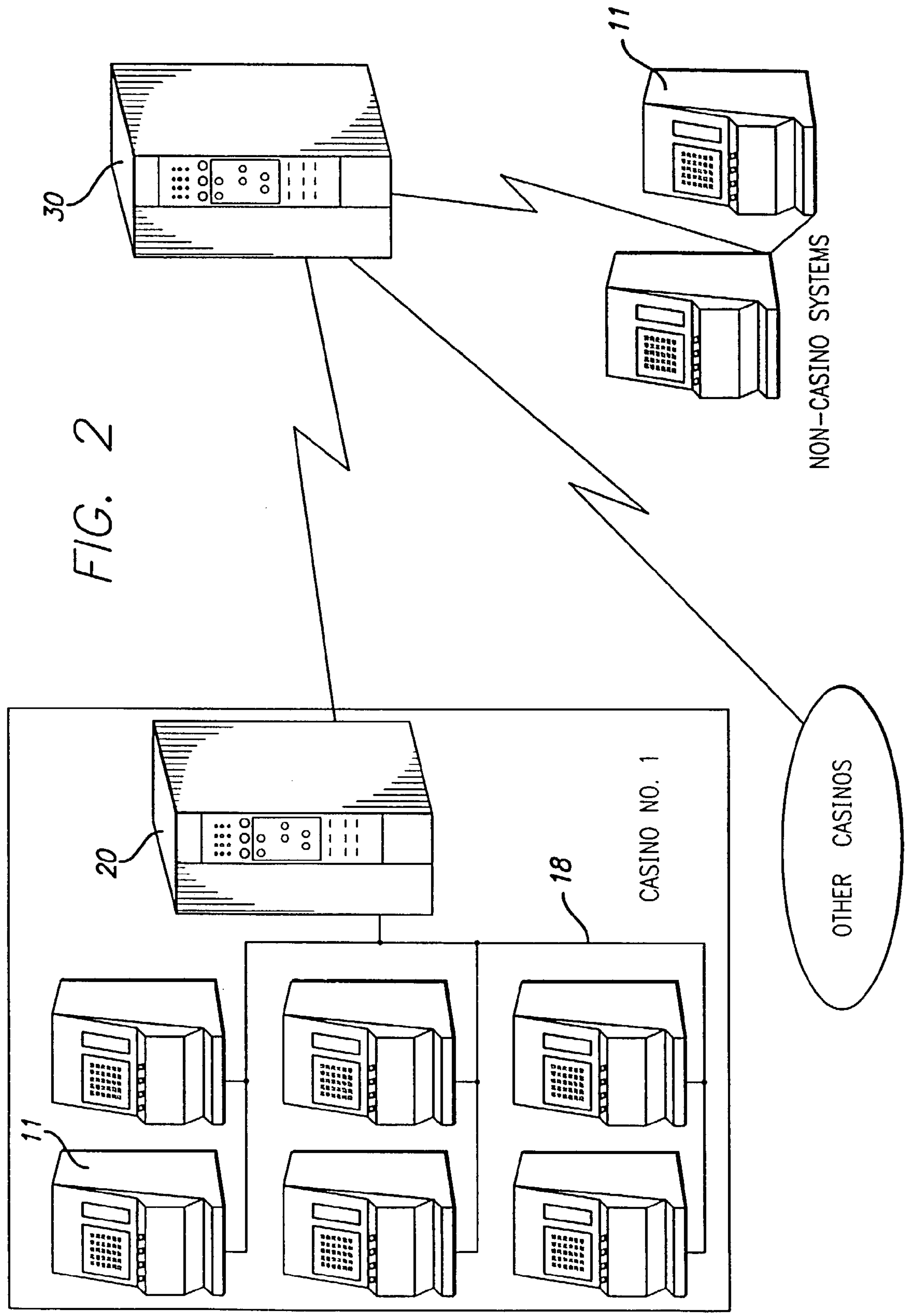
FIG. 2 is a functional diagram of the invention which depicts the interaction of multiple lotto gaming apparatus within a casino with a master casino controller and a master state controller with other casinos and satellite lotto gaming apparatus.

The present invention includes a method and apparatus for player initiation of a lottery type game with rapid acknowledgment of the players' win or loss status.

The present invention can be embodied in several system configurations. One embodiment is depicted in FIG. 1, where a single gaming apparatus 10 for playing a lottery type game such as lotto allows one person to play a game against a single gaming machine. This embodiment comprises a game playing console, such as a Casino Lotto Machine (CLM) 11 which consists of a video display 12, an input/out communications means which can be through keyboard, voice recognition, capacitive touch screen, or other means 13, a Central Processing Unit (CPU) 14 with internal random number generator 15 and memory 16, and a local network connection 18. In this embodiment, input/output capability can be provided by voice communications. In this configuration, a player may insert a bet, typically a dollar ($1.00), and then select up to six numbers, or command the CLM 11 to randomly select six numbers, which are then displayed on the video display terminal 12. Upon satisfaction with the selected numbers the player commands a start by pressing the keyboard 13 PLAY key. A lotto game is started by the CLM 11 which commands the random number generator 15 to select six numbers to be played against the players selected numbers. During this period, the display terminal 12 shows random numbers scrolling on the display screen to simulate a random number selection process, which in fact takes the CPU 14 random number generator 15 less than a millisecond to perform. After a programmed delay for simulated random number display, the CLM 11 randomly generated winning numbers [win numbers] are displayed on the video display terminal 12 and the player selected numbers are compared for any matches. All matching numbers are highlighted on the video display terminal 12 and, if a winning combination is detected,(e.g.; two matches, three matches, etc.), an instant payoff at the CLM 11 occurs. The CLM 11 then interrogates the player to determine if another lotto game will be played. If the player responds yes, another bet from the player is demanded on the video display 12 and the cycle described above repeats.

In a second embodiment of the invention, the lotto gaming apparatus 10 includes one or more game playing consoles such as CLMs 11 connected to a casino master controller (CMC) 20, as depicted in FIG. 2, located within a single gaming facility allowing one or more players to play a lotto game against the CMC 20, but independent of any other players' CLMs 11. In this embodiment, the lotto game is played the same way as with the single CLM embodiment except that the CMC compares the player's numbers with win numbers remotely selected by the CMC so that one or more players are simultaneously playing their personally selected numbers against a set of remotely selected win numbers from the CMC 20 to which their CLM 11 is connected through the network connection 18. In this embodiment of the invention, each player is simultaneously playing the personally selected numbers against a remotely selected CMC 20 generated WIN NUMBER with nearly instant win/loss status acknowledgment and payoff at the CLM 11 they are playing. Each CLM may optionally additionally allow each player to initiate play of and comparison of the personally selected numbers against win numbers generated locally by the player's CLM's as discussed above. As an additional element of this embodiment, more than one casino or gaming facility may be interconnected to a state wide network, or national network, as further shown in FIG. 2 so that a state master controller (SMC) 30 is independently randomly selecting and comparing another set of winning numbers against which each individual CLM 11 is simultaneously playing lotto. The individual player now has three chances to win with a single selection of numbers at the player's local CLM 11 with instant acknowledgment and possible payoff for winning combinations. These game controllers can be connected via communication links, such as switched, dedicated, packet, and the like, or any available electronic communications link system, such as radio, satellite, wire, wireless, cellular, and the like. Multiple such controllers may be provided, and each controller should have the ability to randomly or otherwise generate a set of winning numbers, compare those winning numbers to numbers forwarded to that controller from another controller or game playing console via a hierarchical or distributed communications link, and to return a win/loss status to the other controllers and/or game playing consoles. The generation of the winning numbers need not be via a random number generator, but may be. The generation of winning numbers may also be provided via a mechanical means of selection of winning numbers, computer, wired logic system, and the like.

Another embodiment of the invention, depicted in FIG. 3, involves a plurality of game playing consoles such as terminals 49 for gaming apparatus, namely personal computers with Home lotto Programs (HLP), interconnected via an electronic telecommunications network such as a worldwide electronic communications network, or direct dial-up electronic, communications system, to a worldwide lotto system (WLS) 43 and, associated lotto accounting system (LAS) 44 to credit and debit personal accounts during the lotto gaming process. In this embodiment, individual players would tie onto the. WLS 43 with a personal code and request access to a lotto game. If their credit status is approved by the LAS 44, a lotto game is initiated and played similar to previously describe embodiments, with the exception that in this embodiment the player credit account is charged for the wager automatically and the player selected numbers are played against a single randomly selected set of numbers [WORLDWIDE WIN NUMBERS] generated by the WLS 43. Alternatively, the game could be played without placing any monetary bets, merely by subscribing to the game. The funding of the game could be provided by remote or external means 42, such as advertising provided by a company sponsor, for example, which may be associated with the play of the lotto game. A website could be sponsored by a company placing advertising on the website or otherwise, with intermediate prizes offered that could include discounts on various company products, and a grand prize funded by the company as a progressive jackpot, depending upon the number of persons who dialed up the website and played, for example. Such a game could follow the format of a number of previous jackpot type promotions, with the added attraction of a progressive jackpot, so that the more one plays, the more prizes are awarded and the larger the single jackpot prize can be.

Figure 4:
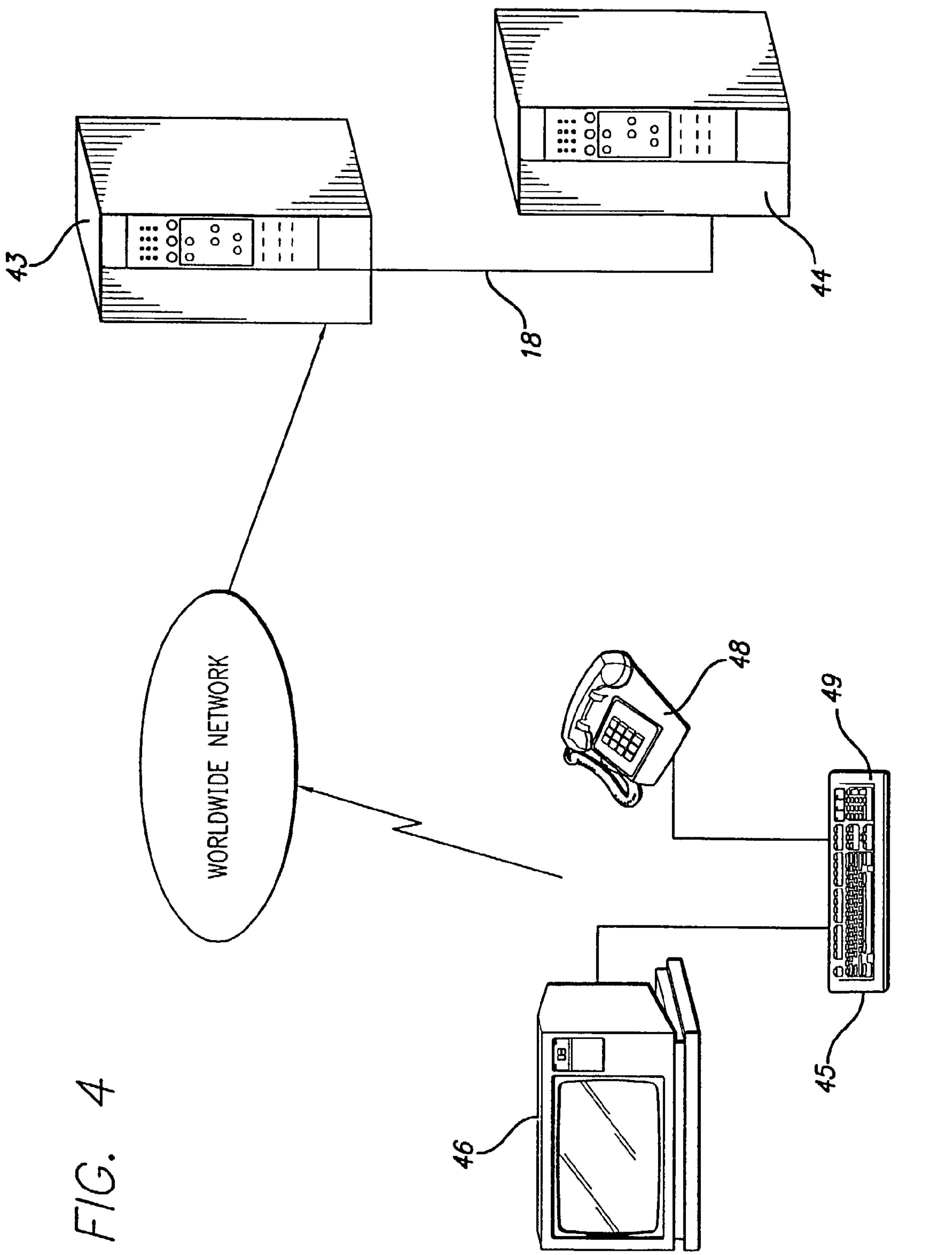
FIG. 4 is a functional diagram of the invention depicting a worldwide lotto game network similar to that shown in FIG. 3, where a home lotto game terminal and TV set replace the home computer.

In another embodiment, depicted in FIG. 4, instead of a personal computer, the game playing console would be a dedicated home lotto terminal (HLT) 49 including a keyboard 45 connected to a home TV set 46, much like a home video game except that this HLT 49 would be connected via an electronic communications network such as via a standard telephone network 48 to the WLS 43 and LAS 44. In the embodiments in FIGS. 3 and 4, the personal computer or television may or may not have a random number generator or other associated means for generating win numbers, or have means for comparing the numbers selected by a player with a set of winning numbers. Rather, the personal computer or television could merely act as a distributed input/output device to interact with the game controller or controllers. Those trained in chance gaming odds, particularly in the lotto gaming odds discipline, will realize the enormity of a worldwide lotto game and the multimillion dollar payoffs that can be quickly generated by such a network.

Figure 5A:
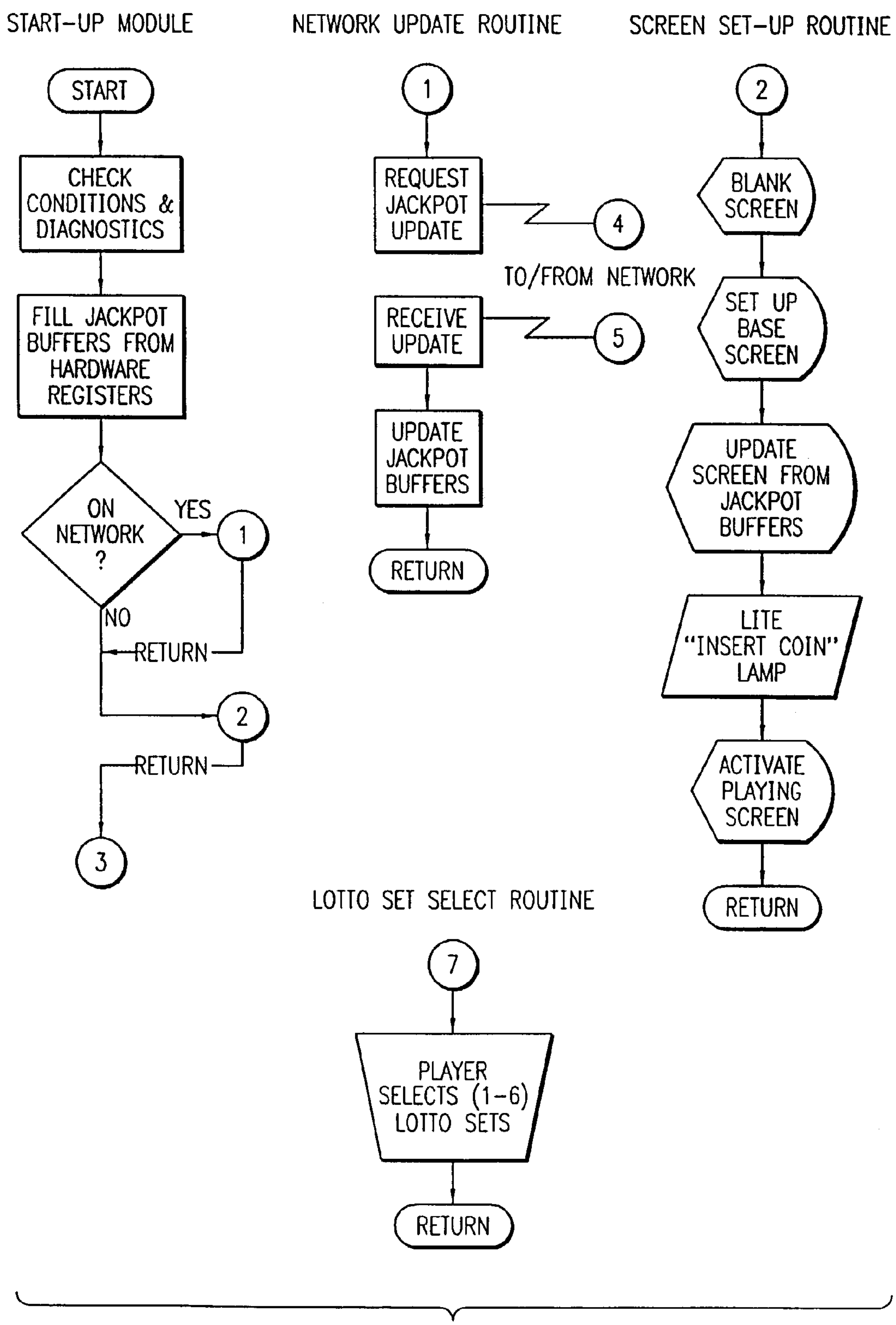
FIGS. 5*a* and 5*b* are software flow diagrams depicting the steps that sequentially occur when a player initiates a lotto game on the lotto gaming apparatus.
Figure 5B:
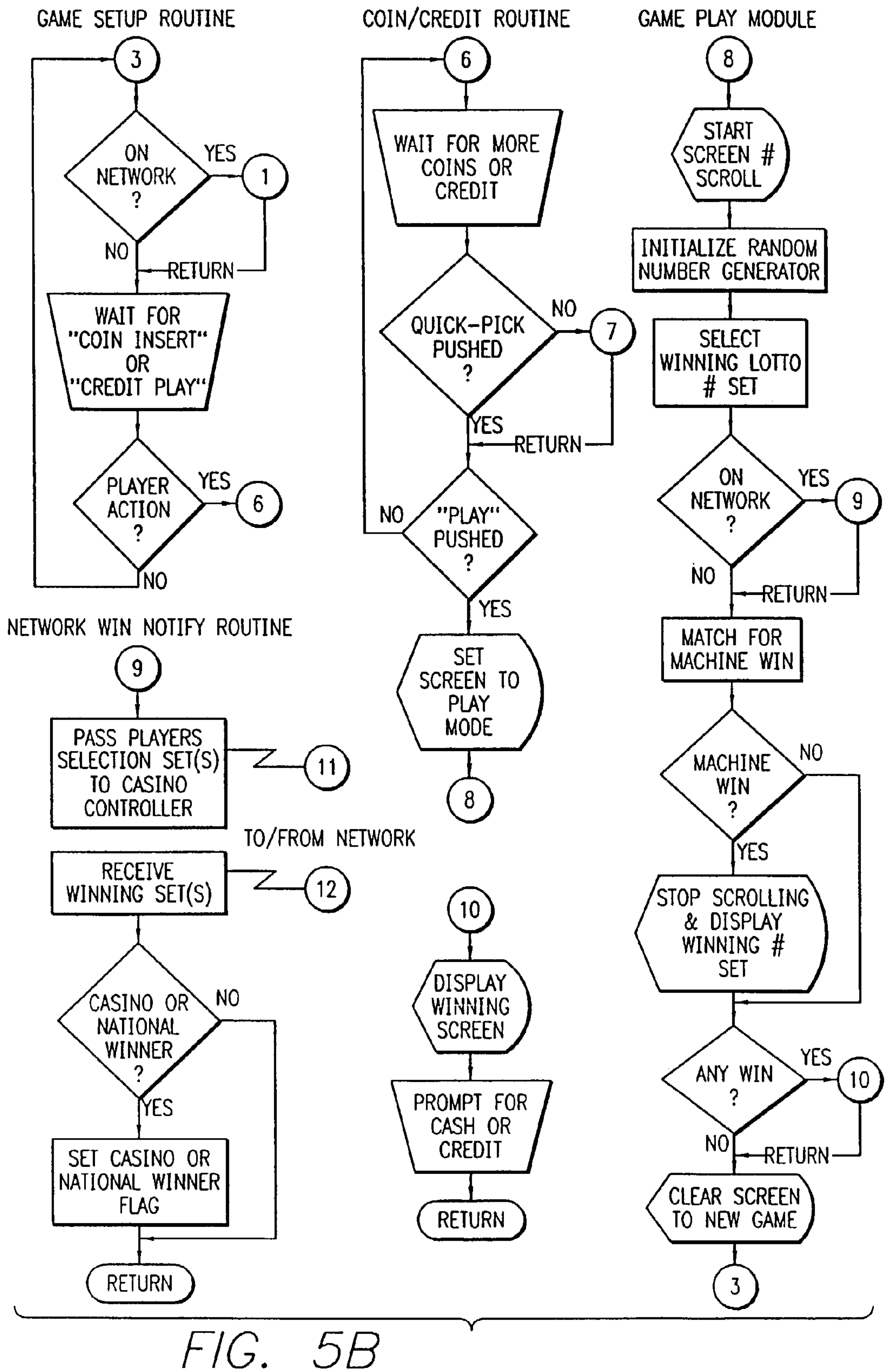

Turning now to FIGS. 5*a* and 5*b*, the CLM 11 software modules and sub-routines are flow charted to depict the sequential events that occur when a player initiates a lotto game on the lotto gaming apparatus in a gaming facility.

A player begins a lotto gaming apparatus 10 sequence by inserting coin(s) or choosing to play credit(s) at a CLM 11. This initiates the following sequence of events:

1. CLM 11 responds by enabling the player to select a "Quick Pick" or manually select the desired set(s) of lotto numbers.

2. The player selects from one to six lotto number playing sets via Quick-Pick or manual number selection and starts a game by pushing the "PLAY" key on the CLM 11.

3. CLM 11 spins numbers on player's video display screen. (Note: This is to show activity on the screen for the player. It is actually a simulation of a random generation process to allow time for the determination of win/loss status at each level of the game).

4. CLM 11 selects machine winning numbers through use of a random number generator.

5. CLM 11 passes players number set selections to CMC 20 via an electronic network.

6. CMC 20 validates each players numbers against the previously selected casino winning numbers. (Note: this can be re-selected on a regular or random basis, changing winning numbers as often as one to three seconds.) Winning numbers are selected through random number generator. CMC 20 increments jackpot for each losing play. If a winner is found, CMC 20 re-sets jackpot to seed level.

7. CMC 20 passes players selections to SMC 30 (City, multiple-casino, state etc.) via electronic network.

8. SMC 30 validates each players numbers against the previously selected state winning numbers. (Note this can be re-selected on a regular or random basis, changing winning numbers as often as one to three seconds.) Winning numbers are selected through random number generator.

9. SMC 30 increments jackpot for each losing play. If a winner is found, SMC 30 re-sets jackpot to seed level. SMC 30 passes win/lost statistics and current jackpot to CMC 20.

10. CMC 20 passes win/lost statistics and current jackpot of casino and SMC 30 to CLM 11.

11. CLM 11 stops spinning, indicates won/lost on video display screen for local CLM 11, casino lotto and state lotto.

12. CLM 11 posts current casino and state lotto jackpots.

13. CLM 11 re-sets and waits for Player to play again.

Figure 6:
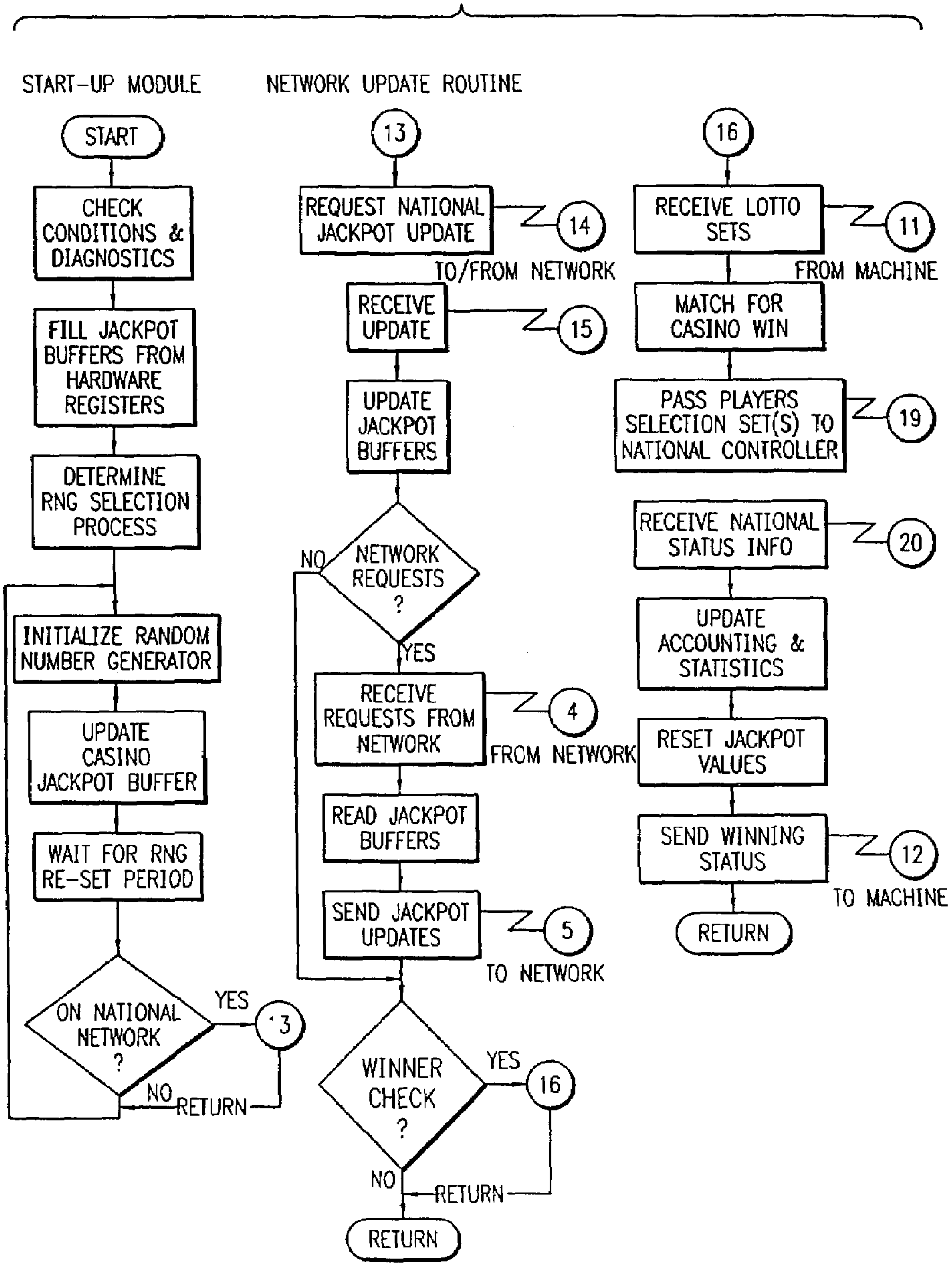
FIG. 6 is a flow diagram depicting the steps that the state controller hardware sequentially performs when a player initiates a lotto game on the lotto gaming apparatus.
Figure 7:
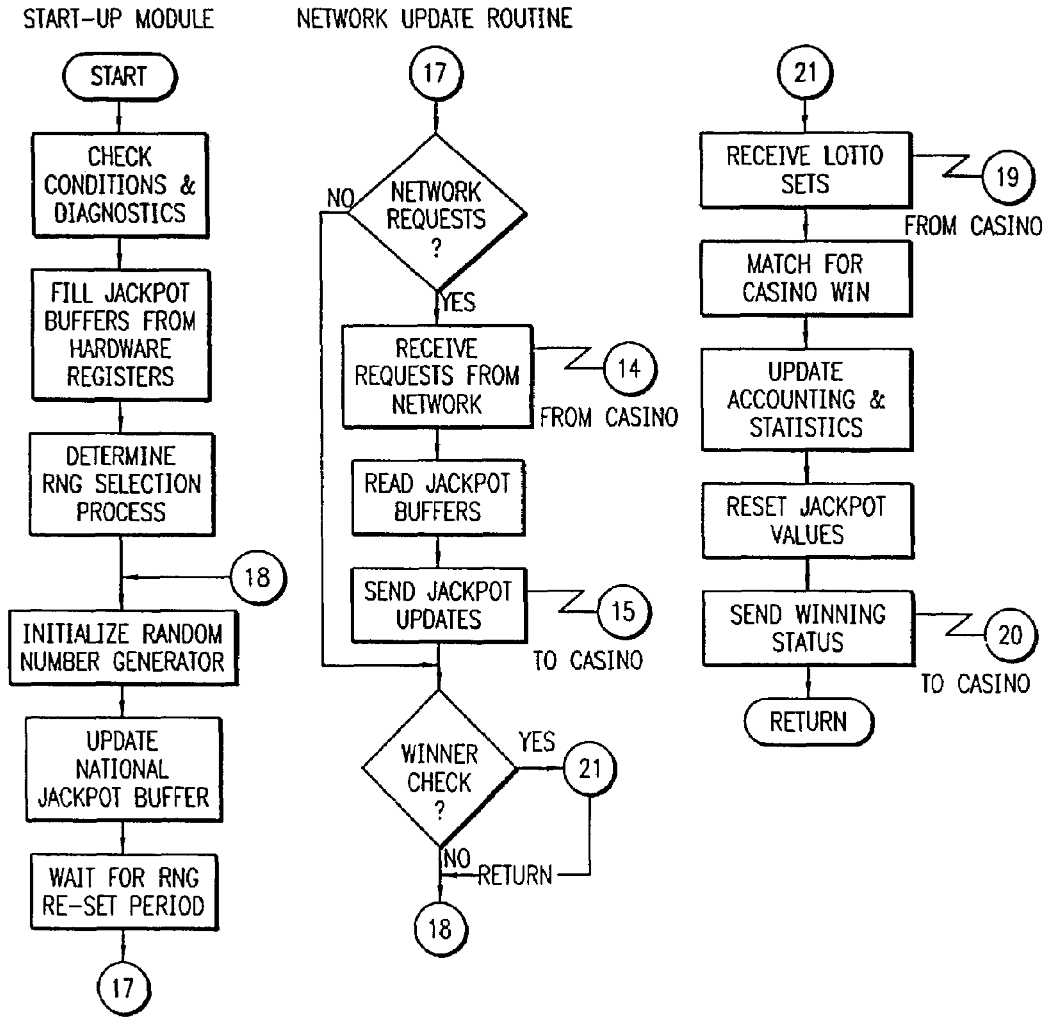
FIG. 7 is a flow diagram depicting the steps that the national controller hardware sequentially performs when a player initiates a lotto game on the lotto gaming apparatus.

Referring now to FIGS. 6 and 7, the flow diagrams depict the sequential events that occur when a player initiates a lotto game on the lotto gaming apparatus from a home environment via an electronic telecommunications network such as the Internet.

A player initiates a lotto playing sequence by starting the Home lotto Program (HLP) on a personal computer, or on a Home lotto Terminal (HLT). The HLP or HLT, (hereafter referred to as the Local Program, LP), executes the appropriate program to initiate the following sequence:

1. The LP prompts the player for his(her) Player Identification (eg.: Name) and his(her) PIN (Player Identification Number, a password). If it matches the one stored in the computer (for security, adult supervision, etc.) the LP initiates contact to the Worldwide lotto System (WLS) either via direct dial, via computer modem or via Internet electronic network.

2. The WLS acknowledges the request for play to the LP and validates serial number and password security with the LP.

3. The LP passes the player's information (PI & PIN) to the WLS.

4. The WLS passes the player's information to the lotto Accounting System (LAS) for verification of current account status.

5. The LAS provides current account status to the WLS. If sufficient credit exists to play, the LP provides positive indication on the video display screen for player, and Internet lotto play may begin. Otherwise, the player is informed of lack of credit and advised to arrange for additional credit. If such a rejection occurs, the LP disconnects from the WLS and resets for further player initiation.

6. The WLS downloads the current account status and current jackpot status to the LP.

7. Assuming the player has sufficient credit to play, the player may begin play by either manually selecting a set(s) of lotto numbers or by pushing "Quick-Pick." If "Quick-Pick" is selected, the LP, using a random number generator, selects from one to six sets of lotto numbers.

8. The player then pushes "PLAY", (on the HLT) or enters "PLAY", (on the computer), and the playing of Internet lotto begins.

9. The LP creates a "spin" on the video display screen to simulate a lotto draw in progress to allow time for the determination of win/loss status. The LP passes the selected lotto number sets to the WLS.

10. The WLS accepts the lotto number sets from the LP and determines win/lose conditions. If a win is realized, the jackpot is zeroed to start, the player's accounting balance is incremented by the amount won and the game status along with the current jackpot is passed to the LP.

11. The LP posts the game status and the current jackpot to the video display screen and completes the game cycle.

12. Based on his current account status, the player can either continue to play or retire from the game.

13. If the player desires to retire from the game, the LP advises the WLS with a request to disconnect. If the WLS approves, the WLS updates the LAS with current account status from the recent game play and advises the LP to disconnect.

14. The LP then disconnects from the WLS and returns to an inactive state or to the DOS/Windows Prompt if via a personal computer.

In any of the embodiments herein described, methods can be incorporated to provide instant status of increasing (progressive) payouts at each level of the lotto game, whether local, gaming facility, state, national or worldwide level. By incorporating a seed level (i.e.; the minimum level of the progressive jackpot after payout of a jackpot—a pick-six-of-six win) an attractive win payout is always available to the player. Also methods provide a variable win/loss ration capability so that the actual and relative win verses loss amounts can be adjusted. Two ways of adjusting the win/loss rations can be by either changing the jackpot seed level or by adjusting the quantity of lotto numbers to be played (e.g.: 51, 60, 70, etc.).

From the above, it can be seen that the present invention represents a method and apparatus for implantation of a lotto game which can have highly attractive playing qualities, relatively low equipment cost and provide virtually instantaneous win/loss results for a variety of normal and progressive games on both a local and distributed basis.

While various preferred embodiments of the invention have been illustrated, it will be seen by those skilled in the art that various modifications and changes may be made thereto without departing from the spirit of the invention as defined in the appended claims.

I claim:

1. A gaming apparatus for the play of a lottery type game, comprising:

a game playing console with display and input/output capability, said game playing console including means for allowing a player to select a series of numbers to be played on said game playing console and for initiation of play of said series of numbers to be played;

remote controller means connected to said game playing console for generating win numbers for each play initiated by said game playing console;

remote comparison means associated with said remote controller means and connected to said game playing console for comparing said win numbers generated by said remote controller means with the numbers selected by the player on said game playing console and for transmitting results of said comparison to said game playing console responsive to said initiation of play by said game playing console;

remote funding means for funding progressive payouts for said win numbers of the lottery type game based upon said comparison of numbers by said remote comparison means; and means associated with said game playing console for displaying a status of progressive payouts for said win numbers of the lottery type game based upon said comparison of numbers by said remote comparison means.

2. The gaming apparatus of claim 1, wherein said remote controller means comprises at least one centralized game controller, each said centralized game controller including means for generating win numbers for each play initiated by said game playing console, and wherein said remote comparison means is associated with each said game controller for comparing win numbers generated separately and independently by each said central game controller, each said central game controller being connected by an electronic communications link to said game playing console.

3. The gaming apparatus of claim 1, wherein said game playing console comprises a personal computer.

4. The gaming apparatus of claim 1, wherein said game playing console comprises a television.

5. The gaming apparatus of claim 1, further comprising local controller means associated with said game playing console for said game playing console to generate win numbers for each play initiated by said game playing console and responsive to said initiation of play by said game playing console.

6. The gaming apparatus of claim 5, further comprising local comparison means associated with said game playing console for comparing said win numbers generated by said local controller means with numbers selected by the player on said game playing console responsive to said initiation of play by said game playing console.

7. The gaming apparatus of claim 6, further comprising means associated with said game playing console for the player to receive payouts from said game playing console based upon said comparison of numbers by said local comparison means and said remote comparison means.

8. A gaming apparatus for the play of a lottery type game, comprising:

a lotto machine with display and input/output capability, said lotto machine including means for allowing a player to select a series of numbers to be played on said lotto machine and for initiation of play of said series of numbers to be played;

local controller means disposed in said lotto machine for said lotto machine to generate first win numbers for each play initiated by the player responsive to said initiation of play by said lotto machine;

remote controller means located connected to said lotto machine for generating second win numbers for each play initiated by said lotto machine responsive to said initiation of play by said lotto machine;

local comparison means associated with said lotto machine for comparing said first win numbers generated by said local controller means with numbers selected by the player on said lotto machine responsive to said initiation of play by said lotto machine;

remote comparison means associated with said remote controller means and connected to said lotto machine for comparing said second win numbers generated by said remote controller means with the numbers selected by the player on said lotto machine and for transmitting results of said comparison to said lotto machine;

remote funding means for funding Progressive payouts for said win numbers of the lottery type name based upon said comparison of numbers by said remote comparison means;

means associated with said lotto machine for a player to receive payouts from said lotto machine based upon said comparison of first and second win numbers by said local comparison means and said remote comparison means responsive to said initiation of play by said lotto machine; and means for displaying a status of progressive payouts for said first and second win numbers of the lottery type game.

9. The gaming apparatus of claim 8, wherein said remote controller means comprises at least one centralized game controller, each said centralized game controller including means for generating win numbers for each play initiated by said lotto machine, and wherein said remote comparison means is associated with each said game controller for comparing win numbers generated separately and independently by each said central game controller, each said central game controller being connected by an electronic communications link to said lotto machine.

10. A gaming apparatus for the play of a lottery type game, comprising:

a plurality of game playing consoles each with display and input/output capability, said plurality of game playing consoles allowing a plurality of players at each of said game playing consoles to select a series of numbers to be played and to select a level of play from a plurality of levels of play having different win/loss ratios and corresponding levels of payouts, and for initiation of play of said numbers;

at least one controller operatively connected to said plurality of game playing consoles, said at least one controller generating win numbers for each play initiated by said plurality of game playing consoles;

remote comparison means disposed in said at least one controller for comparing said win numbers generated by said at least one controller with numbers selected by the plurality of players on said plurality of game playing consoles responsive to said initiation of play by said plurality of game playing consoles;

remote funding means for funding progressive payouts for said win numbers of the lottery type game based upon said comparison of numbers by said remote comparison means; and means associated with said plurality of game playing consoles for displaying a status of progressive payouts of said win numbers of the lottery type game based upon said comparison of said win numbers generated by said at least one controller with numbers selected by the plurality of players responsive to said initiation of play by said plurality of game playing consoles.

11. The gaming apparatus of claim 10, further comprising means associated with plurality of game playing consoles for the plurality of players to receive payouts from said plurality of game playing consoles based upon said comparison of numbers at each game playing console and said level of play for each of the plurality of players responsive to said initiation of play by said plurality of game playing consoles.

12. The gaming apparatus of claim 10, wherein said at least one controller comprises at least one centralized game controller, each said centralized game controller including means for generating win numbers for each play initiated by said plurality of game playing consoles, and wherein said comparison means is associated with each said game controller for comparing win numbers generated separately and independently by each said central game controller, each said central game controller being connected by an electronic communications link to said plurality of game playing consoles.

13. The gaming apparatus of claim 10, wherein said game playing console comprises a personal computer.

14. The gaming apparatus of claim 10, wherein said game playing console comprises a television.

15. The gaming apparatus of claim 10, further comprising local controller means associated with each of said plurality of game playing consoles for said plurality of game playing consoles to generate win numbers for each play initiated by said plurality of game playing consoles and responsive to said initiation of play by said plurality of game playing consoles.

16. The gaming apparatus of claim 15, further comprising local comparison means associated with each of said plurality of game playing consoles for comparing said win numbers generated by each said local controller means with numbers selected by the plurality of players on said plurality of game playing consoles responsive to said initiation of play by said plurality of game playing consoles.

17. The gaming apparatus of claim 16, further comprising means associated with said plurality of game playing consoles for the plurality of players to receive payouts from said plurality of game playing consoles based upon said comparison of numbers by said local comparison means and said remote comparison means.

18. A gaming apparatus for the play of a lottery type game, comprising:

a game playing console with display and input/output capability, said game playing console allowing a player to select a series of numbers to be played on said game playing console and a level of play from a plurality of levels of play having different win/loss ratios and corresponding levels of payouts and for initiation of play of said numbers to be played;

a plurality of controllers operatively connected to said game playing console, said plurality of controllers generating win numbers for each play initiated by said game playing console;

remote comparison means associated with said plurality of controllers for comparing said win numbers generated by said plurality of controllers with numbers selected by the player on said game playing console;

remote funding means for funding progressive payouts for said win numbers of the lottery type game based upon said comparison of numbers by said remote comparison means; and means for displaying a status of progressive payouts for said win numbers of the lottery type game.

19. The gaming apparatus of claim 18, wherein said game playing console comprises a personal computer.

20. The gaming apparatus of claim 18, wherein said game playing console comprises a television.

21. The gaming apparatus of claim 18, wherein each of said plurality of controllers comprises a centralized game controller, each said centralized game controller including means for generating win numbers for each play initiated by said game playing console, and wherein said remote comparison means is associated with each said game controller for comparing win numbers generated separately and independently by each said central game controller, each said central game controller being connected by an electronic communications link to said game playing console.

22. The gaming apparatus of claim 18, further comprising local controller means associated with said game playing console for said game playing console to generate win numbers for each play initiated by said game playing console and responsive to said initiation of play by said game playing console.

23. The gaming apparatus of claim 22, further comprising local comparison means associated with said game playing console for comparing said win numbers generated by said local controller means with numbers selected by the player on said game playing console responsive to said initiation of play by said game playing console.

24. The gaming apparatus of claim 18, further comprising means for the player to receive payouts from said game playing console based upon said comparison of numbers and said selected level of play.

25. The gaming apparatus of claim 23, further comprising means associated with said game playing console for the player to receive payouts from said game playing console based upon said comparison of numbers by said local comparison means and said remote comparison means.

26. A gaming apparatus for the play of a lottery type game, comprising:

a plurality of game playing consoles each with display and input/output capability, said plurality of game playing consoles allowing a plurality of players at each of said game playing consoles to select a series of numbers to be played and a level of play from a plurality of levels of play having different win/loss ratios and corresponding levels of payouts, and for initiation of play of said numbers to be played;

a plurality of controllers operatively connected to said plurality of game playing consoles, said plurality of controllers generating win numbers for each play initiated by the plurality of players;

means associated with each of said plurality of controllers for comparing said win numbers generated by said plurality of controllers with numbers selected by the plurality of players on said game playing consoles responsive to said initiation of play by said plurality of game playing consoles;

remote finding means for finding progressive payouts for said win numbers of the lottery type game based upon said comparison of numbers by said remote comparison means; and means for said plurality of players to receive payouts from said plurality of game playing consoles based upon said comparison of numbers and said selected level of play for each of said plurality of players.

27. The gaming apparatus of claim 26, wherein said game playing console comprises a personal computer.

28. The gaming apparatus of claim 26, wherein said game playing console comprises a television.

29. The gaming apparatus of claim 1, wherein said game playing console is connected to said remote controller means and said remote comparison means by an electronic communications network.

30. The gaming apparatus of claim 29, wherein said electronic communications network comprises a telephone network.

31. The gaming apparatus of claim 18, wherein said game playing console is connected to said plurality of controllers and said remote comparison means by an electronic communications network.

32. The gaming apparatus of claim 31, wherein said electronic communications network comprises a telephone network.

33. The gaming apparatus of claim 26, wherein said plurality of game playing consoles are connected to said plurality of controllers and said means associate with each of said plurality of controllers for comparing said win numbers by an electronic communications network.

34. The gaming apparatus of claim 33, wherein said electronic communications network comprises a telephone network.

* * * * *